(12) United States Patent
Shoji et al.

(10) Patent No.: US 7,638,904 B2
(45) Date of Patent: Dec. 29, 2009

(54) ISOLATED BIDIRECTIONAL DC-DC CONVERTER

(75) Inventors: Hiroyuki Shoji, Chiyoda-ku (JP);
Akihiko Kanouda, Chiyoda-ku (JP);
Ryuichi Saito, Chiyoda-ku (JP); Seigou Yukutake, Chiyoda-ku (JP); Katsuhiro Higuchi, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 153 days.

(21) Appl. No.: 11/206,226

(22) Filed: Aug. 18, 2005

(65) Prior Publication Data

US 2006/0139823 A1    Jun. 29, 2006

(30) Foreign Application Priority Data

Dec. 28, 2004    (JP) ............... 2004-379478

(51) Int. Cl.
*G01R 1/20*    (2006.01)
(52) U.S. Cl. ..................................... 307/154
(58) Field of Classification Search ............... 307/154
See application file for complete search history.

(56) References Cited

U.S. PATENT DOCUMENTS

| 5,636,107 | A | 6/1997 | Lu et al. | |
| 6,278,621 | B1 | 8/2001 | Xia et al. | |
| 6,452,815 | B1 * | 9/2002 | Zhu et al. | ....................... 363/17 |
| 6,767,783 | B2 * | 7/2004 | Casady et al. | ............... 438/234 |
| 6,771,521 | B1 | 8/2004 | Xiong et al. | |
| 2003/0039129 | A1 * | 2/2003 | Miyazaki et al. | ............... 363/26 |

FOREIGN PATENT DOCUMENTS

| EP | 1 261 122 A2 | 11/2002 |
| JP | 7-107743 A | 4/1995 |
| JP | 2000252154 A * | 9/2000 |
| JP | 2002-165448 | 6/2002 |
| JP | 2004-120941 A | 4/2004 |
| JP | 2004-215469 A | 7/2004 |
| JP | 2004-222379 A | 8/2004 |
| JP | 2004-364456 A | 12/2004 |

OTHER PUBLICATIONS

K. Wang et al., "Bi-directional DC to DC Converters for Fuel Cell Systems," 1998 IEEE, p. 47-51.
Mat Hans et al., "*Lossless Compression of Digital Audio*", IEEE Signal Processing Magazine, Jul. 2001, pp. 21-32.
European Search Report dated May 22, 2006 (Eight (8) pages).
Gang Chen et al., "A Novel Fully Zero-Voltage-Switching Phase-Shift Bidirectional DC-DC Converter", 16$^{th}$ Annual IEEE Applied Power Electronics Conference and Exposition, Anaheim, CA, Mar. 4-8, 2001; Annual Applied Power Electronics Conference, New York, NY: IEEE, vol. 2, pp. 974-979, XP010536110 ISBN: 978-0-7803-6618-3.
European Search Report dated Jun. 30, 2008 (eight (8) pages).
Japanese Office Action dated Sep. 8, 2009 with English translation (Seven (7) pages).

* cited by examiner

*Primary Examiner*—Fritz M Fleming
*Assistant Examiner*—Dru M Parries
(74) *Attorney, Agent, or Firm*—Crowell & Moring LLP (57) ABSTRACT

The DC-DC converter connects a first and a second switching circuit for converting power mutually between direct current and alternating current respectively to a first DC power source and a second DC power source and has a transformer between the AC terminals thereof. Here, between the AC terminals of the second switching circuit and the negative pole terminal of the DC power source, a voltage clamp circuit composed of a series unit of switching devices with a reverse parallel diode and a clamp condenser is connected.

An isolated bidirectional DC-DC converter which prevents a reduction in a circulating current at time of buck and an occurrence of a surge voltage at time of voltage boost and realizes highly efficiency, low noise, and miniaturization is provided.

13 Claims, 9 Drawing Sheets

ISOLATED BIDIRECTIONAL DC-DC CONVERTER

CLAIM OF PRIORITY

The present application claims priority from Japanese application Ser. No. 2004-379478, filed on Dec. 28, 2004, the content of which is hereby incorporated by reference into this application.

FIELD OF THE INVENTION

The present invention relates to an isolated bidirectional DC-DC converter.

BACKGROUND OF THE INVENTION

To transfer power between two DC power sources at different voltages, a two-way DC-DC converter having a buck and boost function between the two power sources is required. For example, a power source system of a hybrid car has batteries on the high voltage side and low voltage side, supplies power to a drive motor via an inverter from the high voltage side battery, and supplies power to a car control electronic device from the low voltage side battery. The two batteries are connected via the DC-DC converter to enable mutual transfer of power and the DC-DC converter performs a buck operation when supplying power from the high voltage side to the low voltage side, and in an inverse case, performs a voltage boost operation.

A DC-DC converter having a two-way power conversion function between high and low voltage direct currents like this, for example, is disclosed in Japanese Patent Laid-open No. 2002-165448. The converter connects the high voltage side and low voltage side via a transformer and has a switching circuit for converting power in the two directions of direct current and alternating current on both high and low voltage sides. A power conversion device for converting power in the two directions of direct current and alternating current is called a converter, an inverter, or other various names. Here, it is called a switching circuit. Meanwhile, in Patent Document 1, firstly, the high voltage side switching circuit has a single-phase power conversion circuit in which a switching device is full-bridge (H bridge) connected and a smoothing circuit. On the other hand, the low voltage side switching circuit has a switching rectifying unit and a current fed type single-phase power conversion circuit composed of a choke coil and a smoothing condenser. And, when buck mode, the high voltage side switching circuit is subject to phase shift control, thus a square wave AC voltage is applied to the primary side of the transformer, is dropped by the transformer, is full-wave rectified by the low voltage side switching circuit, and is smoothed by the choke coil and smoothing condenser. When the low voltage side switching circuit performs a rectifying operation in synchronization with the high voltage side switching operation, a highly efficient power conversion can be performed.

On the other hand, when boost mode, the two switches of the low voltage side switching circuit are alternately turned off, thus a current flows through the secondary side of the transformer using the energy storage function of the choke coil, and the core of the transformer is changed in the magnetic flux. An AC voltage component proportional to the changing of the magnetic flux is generated on the primary side, is full-wave rectified by a free wheel diode of the high voltage side switching circuit, and is smoothed by the smoothing condenser.

SUMMARY OF THE INVENTION

In the prior art disclosed in Patent Document 1, when buck mode, a loss due to a circulating current is caused, thus a reduction in efficiency is caused, and when increasing and buck mode, a surge voltage is generated on the low voltage side, and in correspondence to it, it is necessary to increase the breakdown voltage of the switching device, and in either case, enlargement of the apparatus is required.

An object of the present invention is to provide an isolated bidirectional DC-DC converter for suppressing an occurrence of a loss or a surge voltage and realizing efficient miniaturization of the converter.

The present invention, in a phase thereof, is characterized in that in an isolated bidirectional DC-DC converter having a first and a second switching circuit for respectively converting power between direct current and alternating current and a first and a second DC power source on both sides of high voltage and low voltage across a transformer for transferring power between DC power sources at different voltages, between the AC terminal of the second switching circuit and one terminal of the second DC power source, a voltage clamp circuit including a series unit of a switching device with a reverse parallel diode and a capacitor is connected.

The present invention, in another phase thereof, is characterized in that the second switching circuit is a current doubler synchronous rectifier circuit and between both AC terminals of the current doubler synchronous rectifier circuit and one terminal of the second DC power source, two voltage clamp circuits including a series unit of a switching device with a reverse parallel diode and a capacitor are connected.

The present invention, in still another phase thereof, is characterized in that the secondary winding of the transformer has a center tap, and the second switching circuit has a main switching device forming a full-wave rectifying circuit connected to the center tap of the secondary winding and both ends of the secondary winding via a reactor, and between the center tap and one terminal of the second DC power source, a voltage clamp circuit including a series unit of a switching device with a reverse parallel diode and a capacitor is connected.

According to the preferred embodiments of the present invention, in the two-way insulating DC-DC converter, the loss due to the circulating current when buck mode can be reduced.

Further, according to the preferred embodiments of the present invention, an isolated bidirectional DC-DC converter which can prevent an occurrence of a surge voltage on the low voltage side in both modes of buck and voltage boost and can be miniaturized highly efficiently can be provided.

The other objects and characteristics of the present invention will be made clear in the following explanation of the embodiments.

DESCRIPTION OF THE PREFERRED EMBODIMENTS

Embodiment 1

Figure 1:
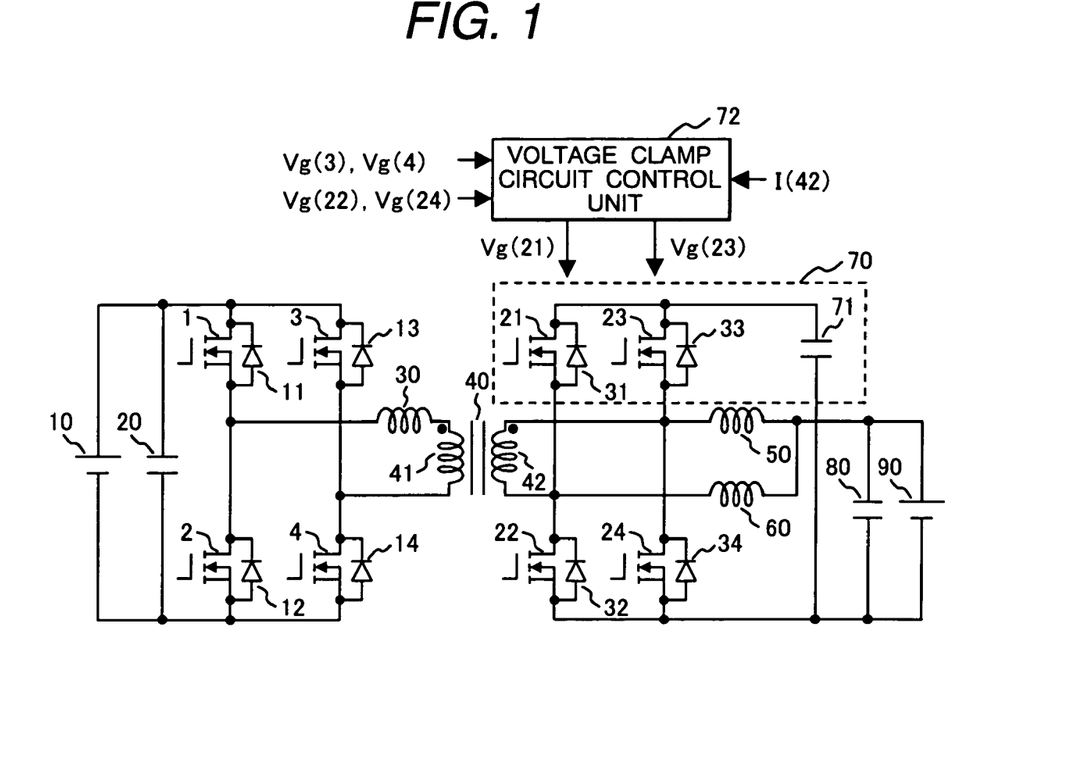
FIG. 1 is a circuit block diagram of the two-way insulating DC-DC converter of Embodiment 1 of the present invention.

FIG. 1 is a circuit block diagram of the two-way insulating DC-DC converter of the first embodiment of the present invention. In the drawing, to a DC power source 10 on the high voltage side, a smoothing condenser 20 and a load (not drawn), a first switching arm composed of switching devices 1 and 2 connected in series, and a second switching arm composed of switching devices 3 and 4 connected in series are connected in parallel. To the switching devices 1 to 4, free wheel diodes 11 to 14 are respectively connected in reverse parallel and when the switching devices 1 to 4 are MOSFETs, a body diode can be used. The first and second switching arms are connected to the DC power source 10 in parallel, so that a voltage switching circuit is formed and between the AC terminals of the switching circuit, a primary winding 41 of a transformer 40 is connected via an auxiliary reactor 30. The auxiliary reactor 30, when inverting the polarity of the current flowing through the switching circuit, plays a role of adjusting the current inclination. Here, the auxiliary reactor 30 can be substituted by a leakage inductance of the transformer 40 and in this case, the auxiliary reactor 30 can be deleted.

Next, the low voltage side constitution will be explained. In this embodiment, on the low voltage side, the current doubler synchronous rectifier circuit is used. The current doubler synchronous rectifier circuit, for example, as disclosed in Japanese Patent Laid-open No. 2003-199339, is well known. To a DC power source 90 on the low voltage side, a smoothing condenser 80 and a load not drawn are connected. Further, to the DC power source 90, a first switching arm composed of a reactor 50 and a switching device 24 connected in series and a second switching arm composed of a reactor 60 and a switching device 22 connected in series are connected in parallel. To the switching devices 22 and 24, free wheel diodes 32 and 34 are respectively connected in reverse parallel and when the switching devices 22 and 24 are MOSFETs, a body diode can be used. The switching devices 24 and 22 are respectively connected to the DC power source 90 via the reactors 50 and 60, so that the low voltage side switching circuit is of a current fed type. Between the AC terminals of the current fed type switching circuit, a secondary winding 42 of the transformer 40 is connected.

Between the AC terminal of the current fed type switching circuit on the low voltage side and one terminal (in this case, the negative pole) of the DC power source 90, a voltage clamp circuit 70 is connected. The voltage clamp circuit 70 is composed of switching devices 21 and 23 and a clamp condenser 71 and to the clamp condenser 71, the switching devices 21 and 23 are respectively connected in series. To the switching devices 21 and 23, free wheel diodes 31 and 33 are respectively connected in reverse parallel and when the switching devices 21 and 23 are MOSFETs, a body diode may be used. These switching devices 21 and 23 are controlled in switching by a voltage clamp circuit control unit 72.

Before explanation of the operation of the two-way insulating DC-DC converter, the power source system of a hybrid car which is an application example will be explained.

Figure 2:
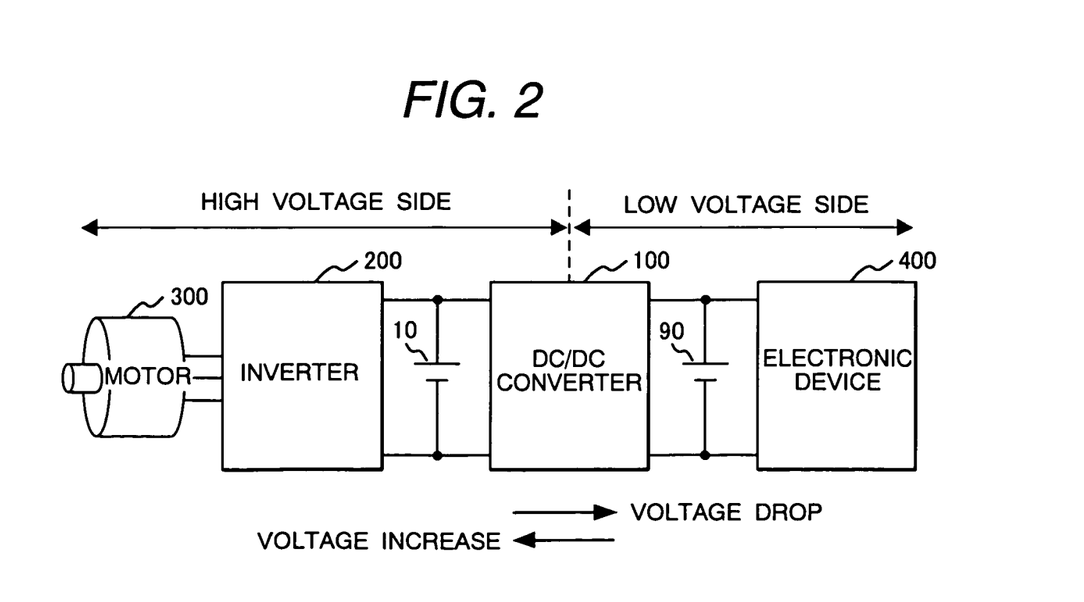
FIG. 2 is a schematic block diagram of a power source system of a hybrid car to which the present invention can be applied.

FIG. 2 is a schematic block diagram of the power source system of a hybrid car. Respectively on the high voltage side and low voltage side, the system has the DC power sources 10 and 90 at different voltages, and to the high voltage side, a car drive motor 300 is connected via an inverter 200, and to the low voltage side, as a load, an electronic device 400 is connected, and between both power sources, a DC-DC converter 100 is connected. When supplying power from the high voltage side to the low voltage side, the DC-DC converter 100 performs a buck operation and when inversely supplying power from the low voltage side to the high voltage side, the DC-DC converter 100 performs a voltage boost operation.

In FIG. 1 again, the buck operation will be explained. Firstly, the basic circuit operation when the voltage clamp circuit 70 is not used will be explained.

Figure 3:
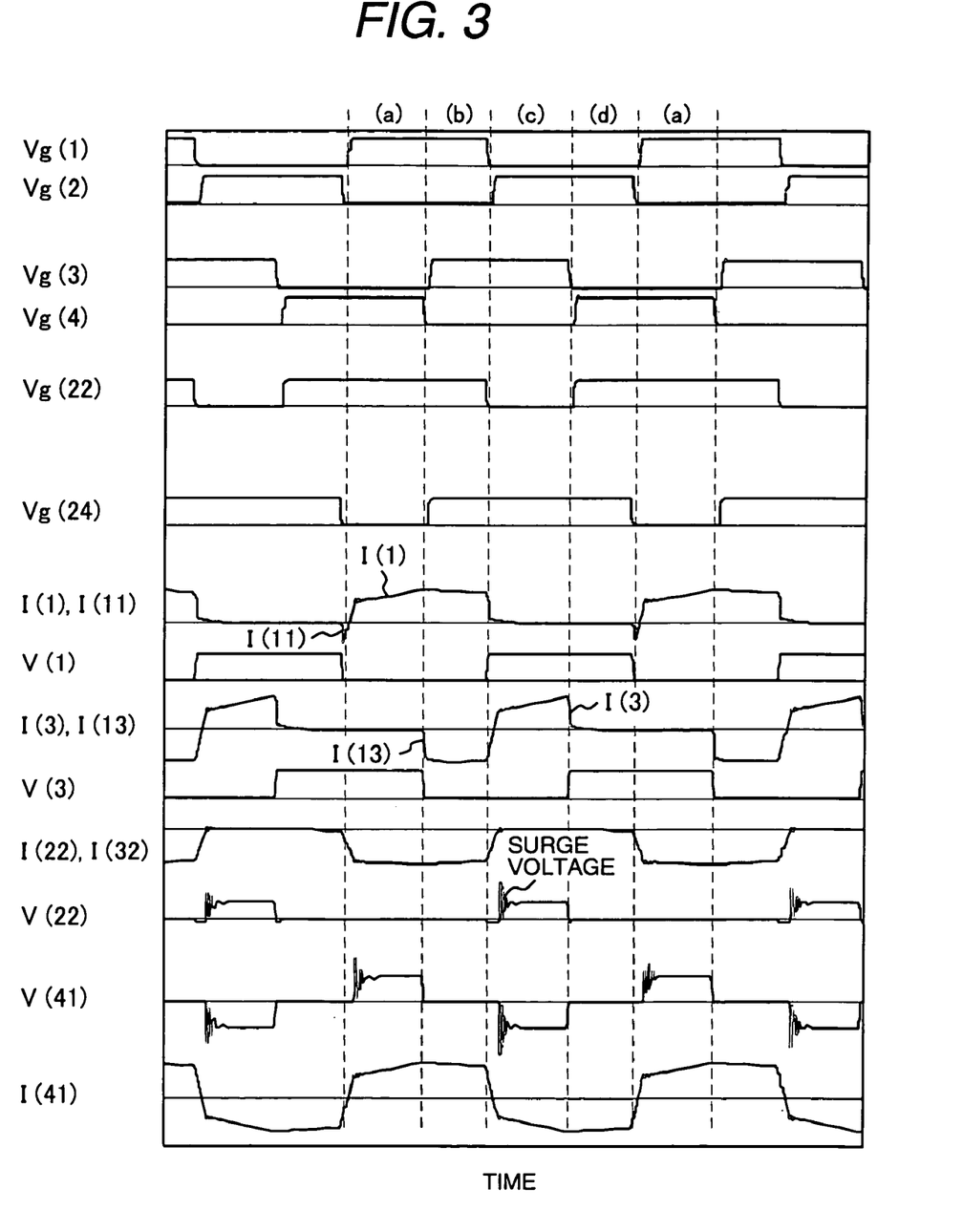
FIG. 3 is an operation waveform diagram at the time of buck when no voltage clamp circuit is used in FIG. 1.

FIG. 3 shows an operation waveform at the time of buck when the voltage clamp circuit 70 is not used. In FIG. 3, Vg (1) to Vg (4) indicate gate drive voltages of the switching devices 1 to 4 on the high voltage side and Vg (22) and Vg (24) indicate gate drive voltages of the switching devices 22 and 24 on the low voltage side. Further, I (1), I (3), and I (22) indicate currents of the switching devices 1, 3, and 22, I (11), I (13), and I (32) currents of the diodes 11, 13, and 32, V (1), V (3), and V (22) voltages of the switching devices 1, 3, and 22, and V (41) and I (41) a voltage and a current of the primary winding 41 of the transformer 40.

At the gate drive voltages Vg (1) to Vg (4), the switching circuit on the high voltage side executes phase shift control. During the period (a) that the on conditions of Vg (1) and Vg (4) are overlapped with each other and during the period (c) that the on conditions of Vg (2) and Vg (3) are overlapped with each other, positive and negative voltages are respectively applied to the primary winding 41 of the transformer 40. In the other periods, both ends of the primary winding 41 are short-circuited.

On the other hand, the switching devices 22 and 24 on the low voltage side are controlled at the drive voltage such as Vg (22) and Vg (24), thus synchronous rectification is executed.

In FIG. 3, during the short circuit period (b) on the high voltage side, that is, during the period of no power supply, the reactor 50 on the low voltage side intends to continue to supply a current, so that the current flows through the route of the reactor 50, smoothing condenser 80, switching device 22, secondary winding 42 of the transformer 40, and reactor 50. Since the current flows through the secondary winding 42, the current flows through the primary winding 41 of the transformer 40 and the circulating current flows through the route of the primary winding 41, diode 13, switching device 1, auxiliary reactor 30, and primary winding 41. Similarly, during the period (d), the circulating current flows through the route of the primary winding 41, auxiliary reactor 30, switching device 2, diode 14, and primary winding 41.

Next, the operation when it is switched from the period (b) to the period (c) will be explained. On the low voltage side, the current flows through the route of the reactor 50, smoothing condenser 80, diode 32, secondary winding 42, and reactor 50 and the route of the reactor 60, smoothing condenser 80, diode 32, and reactor 60. During this period, the switching device 2 on the high voltage side is turned on, and the polarity of the voltage generated in the secondary winding 42 is changed, so that a reverse voltage is applied to the diode 32. The reverse voltage is applied when the diode 32 is in the continuity state, so that a recovery current flows through the route of the secondary winding 42, diode 32, switching device 24, and secondary winding 42, and the moment the diode enters the off state, a surge voltage is generated. Therefore, to the switching device 22, as shown in V (22), the surge voltage is applied. Similarly, when the period (d) is switched to the period (a), the diode 34 performs a recovery operation, thus a surge voltage is generated, and the surge voltage is applied to the switching device 24. As mentioned above, when the voltage clamp circuit 70 is not used, the circulating current flows, and the efficiency is reduced, and a surge voltage is generated, so that it is necessary to increase the breakdown voltage of the switching devices and take measures for noise using a filter.

Next, the operation when the voltage clamp circuit 70 is used will be explained.

Figure 4:
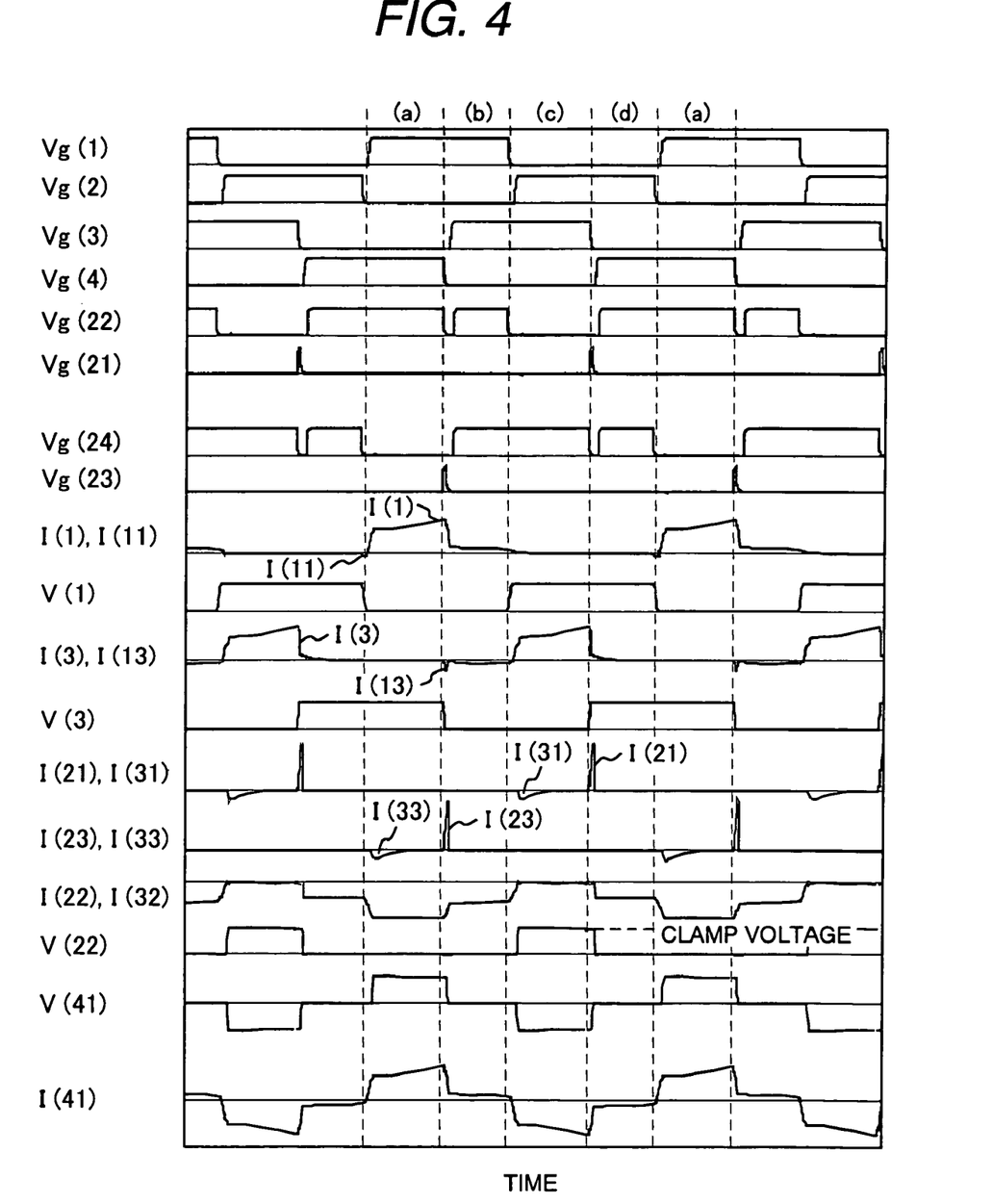
FIG. 4 is an operation waveform diagram at the time of buck when the voltage clamp circuit is used in FIG. 1.

FIG. 4 shows an operation waveform at the time of buck when the voltage clamp circuit 70 is used. To the same parts as those shown in FIG. 3, the same numerals are assigned and the explanation will be omitted. In FIG. 4, Vg (21) and Vg (23) indicate gate drive voltages supplied from the voltage clamp circuit control unit 72 to the switching devices 21 and 23 in the voltage clamp circuit 70. The timing of the gate drive voltages is decided by the voltage clamp circuit control unit 72 depending on control signals of the switching devices of the switching circuits on the high voltage side and low voltage side and a winding current detection value of the transformer 40. Therefore, the control unit 72 inputs the gate drive voltages Vg (3) and Vg (4) of the switching devices 3 and 4 of the high voltage side switching circuit, the gate drive voltages Vg (22) and Vg (24) of the switching devices 22 and 24 of the low voltage side switching circuit, and the winding current I (42) of the transformer 40. I (21) and I (23) indicate currents of the switching devices 21 and 23 and I (31) and I (33) indicate currents of the diodes 31 and 33.

In FIG. 4, when switching the power supply period of the period (a) to the period (b), the switching device 22 set in the continuity state for synchronous rectification is turned off once and the switching device 23 of the voltage clamp circuit 70 is turned on. Namely, at the timing of switching both ends of the primary winding to short-circuiting by the first switching circuit from the state that the primary winding of the transformer is supplied with a voltage from the first switching circuit, the switching devices 21 and 23 in the voltage clamp circuit 70 are turned on. By doing this, a current is supplied to the reactor 50 from the clamp condenser 71 via the switching device 23, so that the current flowing through the route of the reactor 50, smoothing condenser 80, diode 32, secondary winding 42, and reactor 50 is reduced. Therefore, the current flowing through the primary winding 41 of the transformer 40 is reduced as shown in I (41) and the circulating current flowing through the route of the primary winding 41, diode 13, switching element 1, auxiliary reactor 30, and primary winding 41 can be reduced.

Here, when the on period of the switching device 23 is prolonged, the current flows inversely through the route of the clamp condenser 71, switching device 23, secondary winding 42, reactor 60, smoothing condenser 80, and clamp condenser 71 and in the switching circuit on the high voltage side, the opposite circulating current flows. Therefore, the switching element 23 detects the current I (42) of the primary winding 41 of the transformer 40 or the secondary winding 42 thereof and is desirably turned off when the current is reduced to almost zero. Further, it is desirable to calculate and control the on period of the switching device 23 beforehand from the auxiliary reactor 30, turn ratio of the transformer 40, DC power sources 10 and 90, and power.

When switching the period (c) to the period (d), in the same way as with the aforementioned, the switching device 24 is turned off once and the switching device 21 of the voltage clamp circuit 70 is turned on. By doing this, a current is supplied to the reactor 60 from the clamp condenser 71, and the current flowing through the secondary winding 42 is reduced, thus the circulating current can be reduced. It is desirable to control the on period of the switching device 21 in the same way as with the switching device 23 aforementioned.

Next, the operation when switching the period (b) to the period (c) will be explained. When the voltage clamp circuit 70 aforementioned is not used, a surge voltage is generated and is applied to the switching device 22. On the other hand, when the voltage clamp circuit 70 is used, an occurrence of a surge voltage can be prevented. Namely, the current shown in I (31) flows through the route of the secondary winding 42, diode 31, clamp condenser 71, switching device 24, and secondary winding 42 and the voltage of the switching device 22 is clamped by the voltage of the clamp condenser 71.

Similarly, when switching the period (d) to the period (a), the current shown in I (33) flows through the route of the secondary winding 42, diode 33, clamp condenser 71, switching device 22, and secondary winding 42. Therefore, the voltage of the switching device 24 is clamped by the voltage of the clamp condenser 71 and an occurrence of a surge voltage can be prevented.

As described in Embodiment 1, when the voltage clamp circuit 70 is used, the circulating current is reduced and an occurrence of a surge voltage can be prevented, so that a highly efficient low-noise buckping operation can be realized.

For the switching circuit on the low voltage side in this embodiment, the current doubler rectifier circuit is used, and compared with the diode bridge full-wave rectifier circuit, the rectifying unit can be connected to the negative side of the DC terminal, so that the synchronous rectification switching device can be driven easily. Furthermore, there are two energy storage reactors installed, so that they respectively take charge of ½ of the output current, and when the energy of one reactor is discharged on the output side via the rectifying unit and the current is reduced, the other flows in the direction of increasing the current from the transformer to the output side via the reactor. Therefore, as a result, the ripple current on the output side is cancelled and there is an advantage of reduction of the ripple current.

Next, the voltage boost operation will be explained. In the same way as with the case of buck aforementioned, firstly, the basic circuit operation when the voltage clamp circuit 70 shown in FIG. 1 is not used will be explained.

Figure 5:
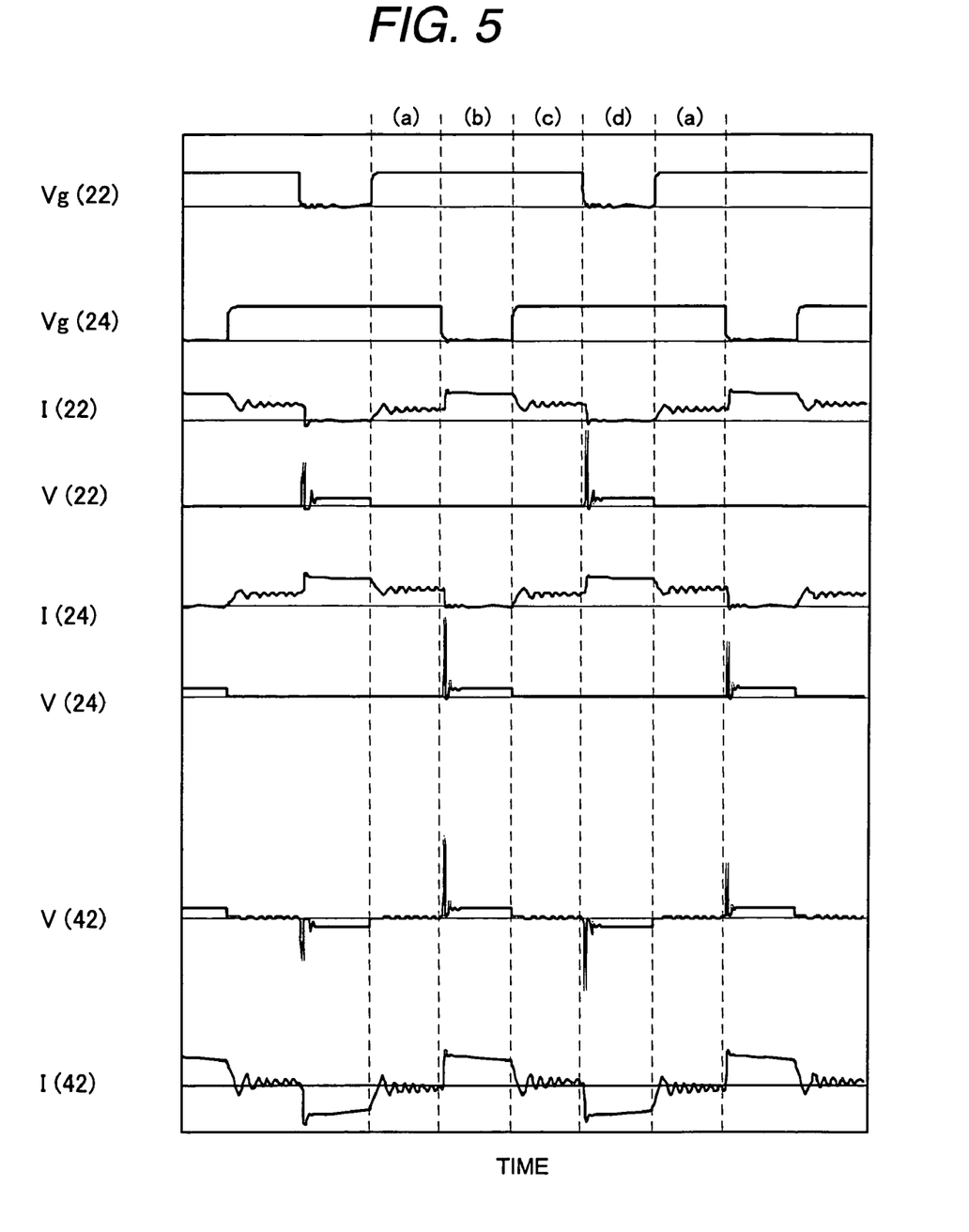
FIG. 5 is an operation waveform diagram at the time of voltage boost when no voltage clamp circuit is used in FIG. 1.

FIG. 5 shows an operation waveform at the time of voltage boost when the voltage clamp circuit is not used. In FIG. 5, Vg (22) and Vg (24) indicate gate drive voltages of the switching devices 22 and 24 on the low voltage side and I (22) and I (24) indicate currents of the switching devices 22 and 24. Further, V (22) and V (24) indicate voltages of the switching devices 22 and 24 and V (42) and I (42) indicate a voltage and a current of the secondary winding 42 of the transformer 40. In FIG. 5, during the periods (a) and (c), the switching devices 22 and 24 on the low voltage side, as shown in Vg (22) and Vg (24), are put into the on state and store magnetic energy in the reactors 50 and 60. During the periods (b) and (d), the switching device 24 or 22 is put into the off state, a current flows through the secondary winding 42 of the transformer 40 using the stored energy of the reactors 50 and 60, and power is supplied from the low voltage side to the high voltage side. When the switching device 24 is turned off during the period (b), the reactor 50 intends to continuously supply the current by the stored energy, so that the current flows through the route of the reactor 50, secondary winding 42, switching device 22, smoothing condenser 80, and reactor 50. The current flows through the secondary winding 42 and the magnetic flux of the transformer 40 is changed, so that in the primary winding 41 of the transformer 40, a current proportional to the changing of the magnetic flux tends to flow. However, between the primary winding 41 and the smoothing condenser 20, the auxiliary reactor 30 is installed and the current is prevented from changing. Therefore, the current route by the stored energy of the reactor 50 is cut off, thus a surge voltage is generated and is applied to the switching device 24 as shown in V (24). Similarly, during the period (d), when the switching device 22 is turned off, the current route by the stored energy of the reactor 60 is cut off, thus a surge voltage is generated and is applied to the switching device 22 as shown in V (22). As mentioned above, when the voltage clamp circuit 70 is not used, in the same way as with buck, a surge voltage is generated, so that it is necessary to increase the breakdown voltage of the switching devices and take measures for noise using a filter.

Next, the operation when the voltage clamp circuit 70 is used will be explained.

Figure 6:
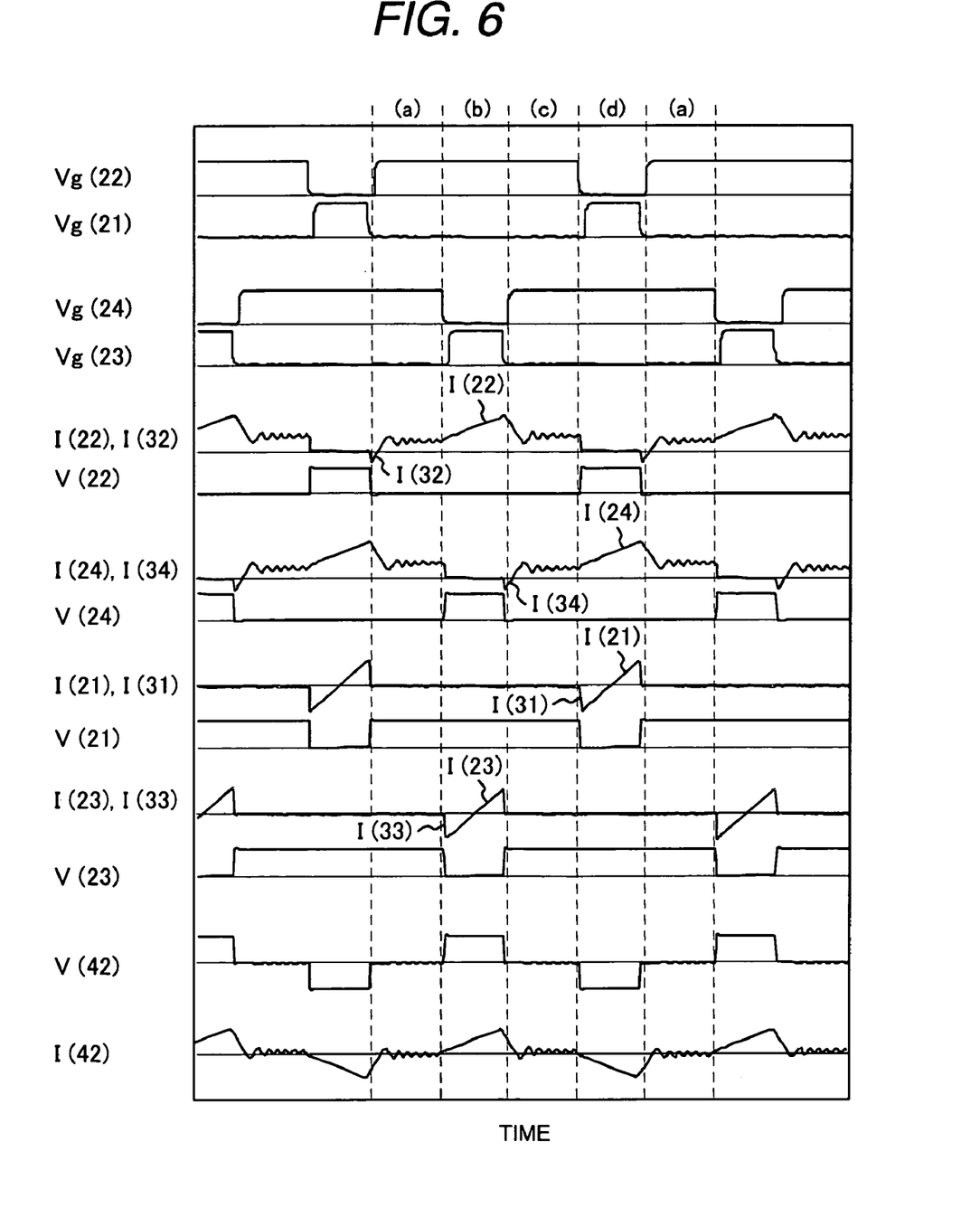
FIG. 6 is an operation waveform diagram at the time of voltage boost when the voltage clamp circuit is used in FIG. 1.

FIG. 6 shows an operation waveform at the time of voltage boost when the voltage clamp circuit is used. To the same parts as those shown in FIG. 5, the same numerals are assigned and the explanation will be omitted. In FIG. 6, Vg (21) and Vg (23) indicate gate drive voltages of the switching devices 21 and 23 of the voltage clamp circuit 70. I (21) and I (23) indicate currents of the switching devices 21 and 23, I (31) to I (34) currents of the diodes 31 to 34, and V (21) and V (23) voltages of the switching devices 21 and 23.

The switching devices 21 and 23 of the voltage clamp circuit 70 and the switching devices 22 and 24 are mutually turned on and off repeatedly to execute auxiliary drive. Namely, during the off period of the main switching devices 22 and 24, the switching devices 21 and 23 of the voltage clamp circuit 70 are respectively turned on. When the switching device 24 is turned off during the period (b), the current intends to flow continuously by the stored energy of the reactor 50, though as described above, the auxiliary reactor 30 is connected to the high voltage side, so that the current is prevented from changing. However, the current in correspondence to suppression by the auxiliary reactor 30 among the stored energy of the reactor 50, as shown in I (33), can flow through the route of the reactor 50, diode 33, clamp condenser 71, smoothing condenser 80, and reactor 50. Therefore, the voltage of the switching device 24 is clamped by the voltage of the clamp condenser 71 and an occurrence of a surge voltage is prevented. When the current of the reactor 50 is reduced and the current of the secondary winding 42 is increased, since the switching device 23 is in the on state, a current is supplied to the secondary winding 42 from the clamp condenser 71 via the switching device 23. Therefore, the energy of the clamp condenser 71 is used effectively during the power supply period from the low voltage side to the high voltage side.

Similarly, when the switching device 22 is turned off during the period (d), the voltage of the switching device 22 is clamped by the voltage of the clamp condenser 71. Namely, a part of the current of the reactor 60 flows through the route of the reactor 60, diode 31, clamp condenser 71, smoothing condenser 80, and reactor 60 and an occurrence of a surge voltage is prevented. When the current of the reactor 60 is reduced and the current of the secondary winding 42 is increased, since the switching device 21 is in the on state, a current is supplied to the secondary winding 42 from the clamp condenser 71 via the switching device 21. Therefore, the energy of the clamp condenser 71 is used effectively during the power supply period from the low voltage side to the high voltage side.

As mentioned above, when the voltage clamp circuit 70 is installed, an occurrence of a surge voltage can be prevented, so that a voltage boost operation of low loss and low noise can be realized.

Here, in this embodiment, when there is an inductance between the switching devices 21 and 23 of the voltage clamp circuit 70 and the clamp condenser 71, in the buck and voltage boost operations, the surge voltage suppression effect is reduced. The inductance is considered as an internal inductance of the condenser or a wiring inductance and it is desirable to select a chip type laminated ceramics condenser as a low-inductance condenser. Further, to reduce the wiring inductance, it is desirable to use the following mounting.

Figure 7:
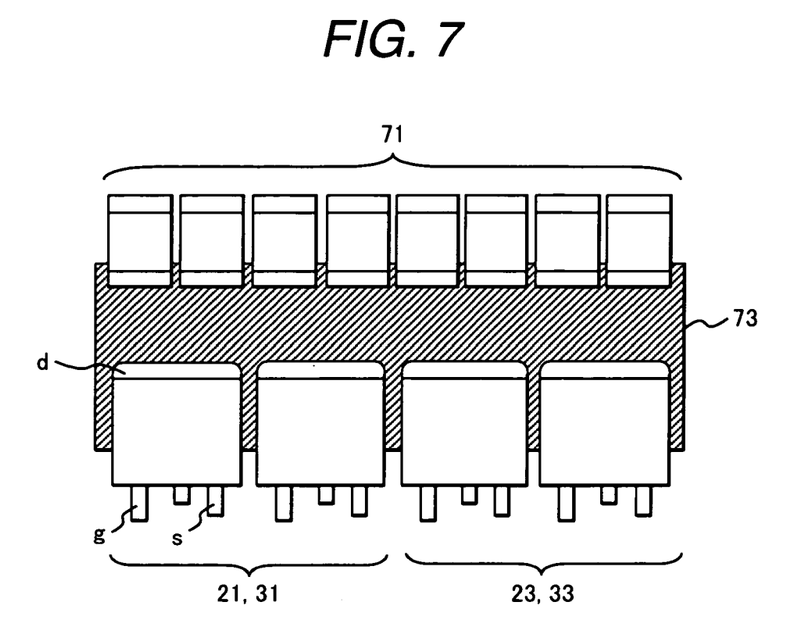
FIG. 7 is a part mounting diagram of the voltage clamp circuit of the first embodiment of the present invention.

FIG. 7 is a mounting diagram of the parts of the voltage clamp circuit of the first embodiment of the present invention. The switching devices 21 and 23 with a reverse parallel diode are arranged side by side and a plurality of unit condensers forming the clamp condenser 71 are also arranged side by side. And, both parallel bodies are arranged closely opposite to each other and are electrically connected by a wiring pattern 73 with a width covering the overall width thereof. By doing this, the wiring inductance of the voltage clamp circuit is controlled to its minimum.

In FIG. 7, two switching devices 21 and 23 are respectively arranged in parallel and eight clamp condensers 71 are arranged in parallel. The switching devices 21 and 23 have a source terminal s, a drain terminal d, and a gate terminal g and so as to make the terminal surfaces of the drain terminals d linear, the switching devices are arranged side by side on a plane substrate. On the other hand, the clamp condensers 71 in the voltage clamp circuit 70 have a plurality of chip type laminated ceramics condensers and so that the terminal surfaces of the unit condensers are made linear, the clamp condensers are arranged side by side on a plane substrate. The two are electrically connected by the wiring pattern 73 covering the full width of the two, so that the wiring inductance between the two is controlled to a very small value and the voltage clamp operation can be displayed at its maximum.

Embodiment 2

Figure 8:
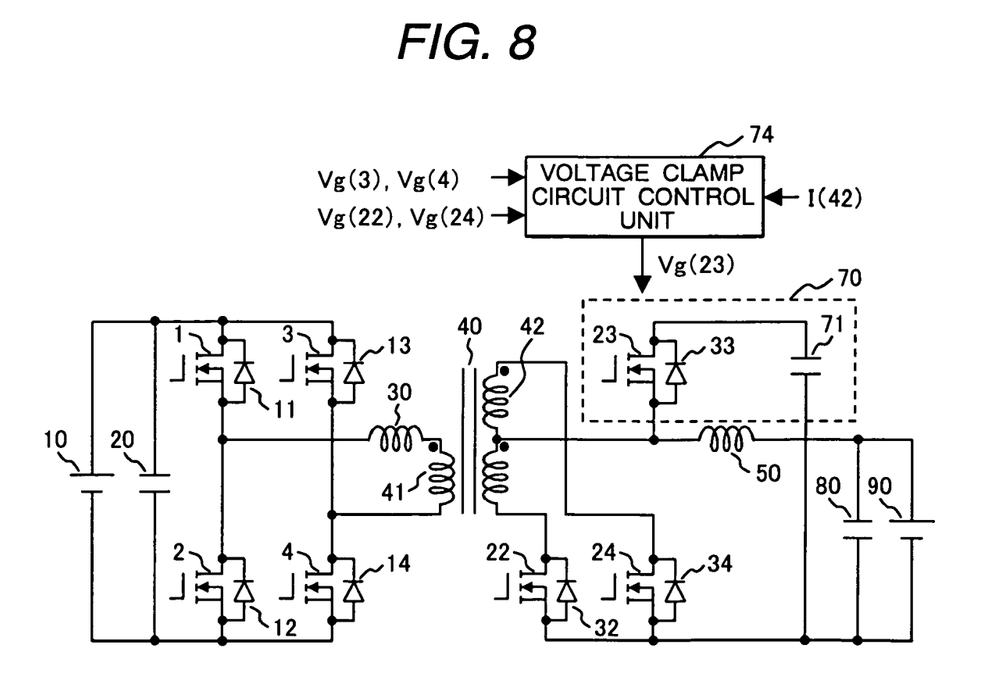
FIG. 8 is a circuit block diagram of the two-way insulating DC-DC converter of Embodiment 2 of the present invention.

FIG. 8 is a circuit block diagram of the two-way insulating DC-DC converter of the second embodiment of the present invention. To the same parts as those shown in FIG. 1, the same numerals are assigned and the explanation will be omitted. In FIG. 8, the difference on the basic circuit from FIG. 1 is that a center tap is installed on the secondary winding 42 of the transformer 40, and the reactor 50 is connected between the center tap and the positive pole of the DC power source 90, and the reactor 60 is removed. By doing this, the voltage clamp circuit 70 is composed of only one series unit of the switching device 23 with the reverse parallel diode 33 and the clamp condenser 71 and the number of parts can be reduced. The switching device 23 is driven by the voltage clamp circuit control unit 74 and is controlled in switching.

Figure 9:
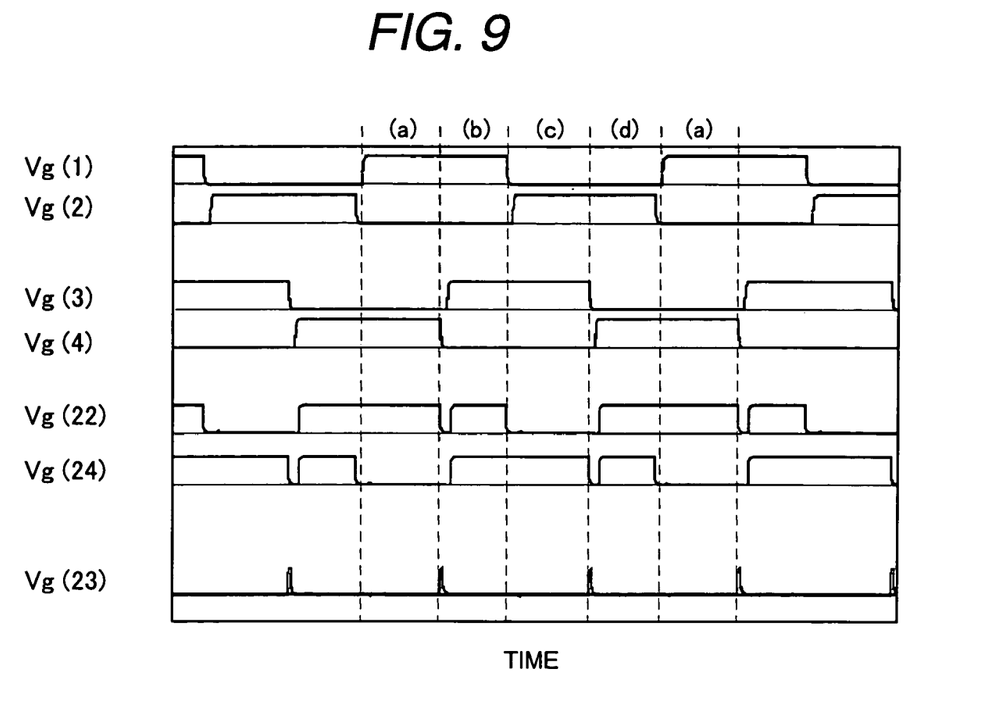
FIG. 9 is an operation waveform diagram at the time of buck in FIG. 8.

FIG. 9 is a drive voltage waveform diagram of each switching device at the time of buck of the second embodiment of the present invention. In the drawing, Vg (23) indicates a gate drive voltage given from the voltage clamp circuit control unit 74 to the switching element 23 in the voltage clamp circuit 70.

The timing of the gate drive voltage is decided by the voltage clamp circuit control unit 74 depending on control signals of the switching devices of the switching circuits on the high voltage side and low voltage side and a winding current detection value of the transformer 40. Therefore, the control unit 74 inputs the gate drive voltages Vg (3) and Vg (4) of the switching devices 3 and 4 of the high voltage side switching circuit, the gate drive voltages Vg (22) and Vg (24) of the switching devices 22 and 24 of the low voltage side switching circuit, and the winding current I (42) of the transformer 40. The difference from Embodiment 1 aforementioned is that the switching device 23 of the voltage clamp circuit 70 is turned on in synchronization with the off timing of the switching devices 3 and 4 on the high voltage side and the switching device 23 serves concurrently as the switching device 21 of Embodiment 1.

The off timing of the switching device 3 or 4 of this embodiment is the timing that the state (a) or (c) that a voltage is applied from the first switching circuit to the primary winding of the transformer is switched to the state (b) or (c) that both ends of the primary winding are short-circuited by the first switching circuit. The on period of the switching device 23, as in the embodiment aforementioned, can be turned off by detecting that the current of the primary winding 41 or secondary winding 42 is reduced to almost zero. However, there is not a route through which a current flows from the clamp condenser 71 to the secondary winding 42 via the switching device 23 and even if the on period of the switching device 23 is prolonged, there is no problem. Therefore, it is easy to preset the on period calculated from the auxiliary reactor 30, turn ratio of the transformer 40, DC power sources 10 and 90, and power and control it at this timing. Therefore, in this embodiment, the switching device 23 may be kept on in a predetermined short time, and there is no need to worry about the timing for turning it off, and in correspondence to it, the controllability of the voltage clamp circuit control unit 74 at the time of buck is superior to that of Embodiment 1. At the time of buck, at the timing that the state (a) or (c) that a voltage is applied from the first switching circuit to the primary winding of the transformer is switched to the state (b) or (d) that both ends of the primary winding are short-circuited by the first switching circuit, it is desirable to keep the switching device 23 on in a proper short time.

As mentioned above, also in this embodiment, at the time of buck, the loss due to the circulating current is reduced, and simultaneously an occurrence of a surge voltage is prevented, and a highly efficient low noise buck operation can be realized.

Figure 10:
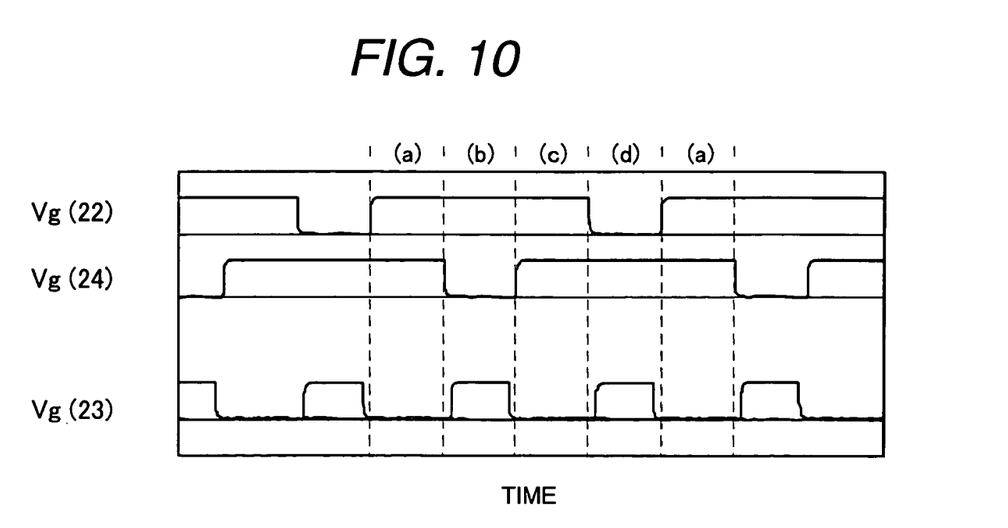
FIG. 10 is an operation waveform diagram at the time of voltage boost in FIG. 8.

FIG. 10 is a drive voltage waveform diagram of each switching device at the time of voltage boost of the second embodiment of the present invention. The difference from Embodiment 1 aforementioned is that the switching device 23 of the voltage clamp circuit 70 is turned on for the period that the switching devices 22 and 24 on the low voltage side are off and the switching device 23 serves concurrently as the switching device 21 of Embodiment 1.

Similarly to Embodiment 1, the switching devices 22 and 24 on the low voltage side are turned on like Vg (22) and Vg (24) and magnetic energy is stored in the reactor 50, though at this time, in this embodiment, a current flows also through the secondary winding 42. However, the secondary winding 42 has a structure of a pair of windings that the numbers of turns on both sides of the center tap are equal, and opposite currents flow through the windings, so that the magnetic flux of the transformer 40 is reduced to zero, and during this period, no voltage is induced in the primary winding 41.

Next, when the switching device 24 or 22 is turned off, a current flows through the secondary winding 42 of the transformer 40 by the stored energy of the reactor 50 and power is supplied from the low voltage side to the high voltage side. At this time, similarly to Embodiment 1, the changing of the current is suppressed by the auxiliary reactor 30 on the high voltage side. However, the current in correspondence to suppression by the auxiliary reactor 30 among the stored energy of the reactor 50 can flow through the route of the reactor 50, diode 33, clamp condenser 71, smoothing condenser 80, and reactor 50. Therefore, the voltage of the switching device 24 is clamped by the voltage of the clamp condenser 71 and an occurrence of a surge voltage is prevented. When the current of the reactor 50 is reduced and the current of the secondary winding 42 is increased, since the switching device 23 is in the on state, a current is supplied to the secondary winding 42 from the clamp condenser 71 via the switching device 23. Therefore, the energy of the clamp condenser 71 is used effectively during the power supply period from the low voltage side to the high voltage side.

In the switching circuit on the low voltage side of this embodiment, the voltage clamp circuit 74 which is the so-called active clamp using a center tap rectifier circuit is connected between the center tap of the transformer 40 and one end of the second DC power source. Therefore, there is only one reactor on the low voltage side, so that there is an advantage that one switching device is enough. The rectifying unit, similarly to the current doubler aforementioned, can be connected to the negative side of the DC terminal, so that the synchronous rectification switching device can be driven easily.

As mentioned above, also in Embodiment 2, an occurrence of a surge voltage is prevented and a voltage boost operation of low noise can be realized.

Embodiment 3

When the two-way insulating DC-DC converter of the present invention, for example, is used in a power source system for a car, it must be mounted in a limited space, so that a request for miniaturization is increased and a stable operation in a high-temperature environment is required. Therefore, as a converter, miniaturization of the transformer and reactor by realization of high frequency, reduction in the on loss of the switching devices and the number of switching devices, and improvement of the cooling method are required.

Figure 11:
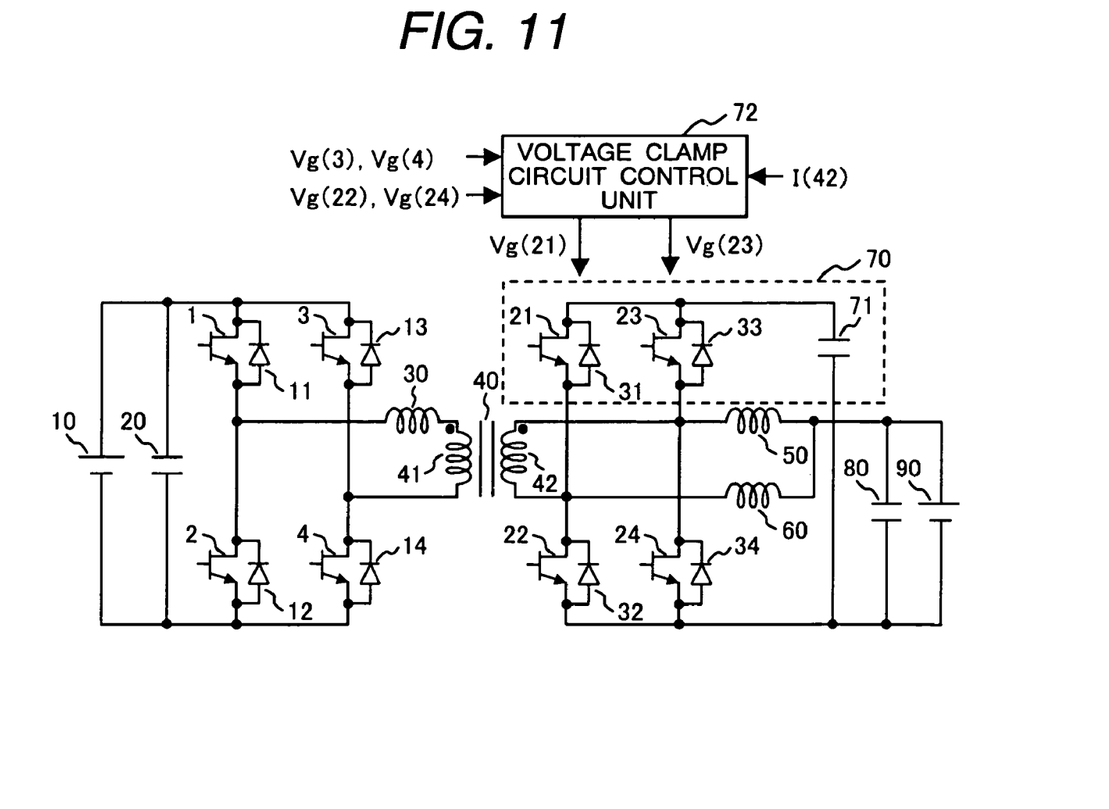
FIG. 11 is a circuit block diagram of the two-way insulating DC-DC converter of Embodiment 3 of the present invention.

FIG. 11 is a circuit block diagram of the two-way insulating DC-DC converter of the third embodiment of the present invention. The difference from Embodiment 1 shown in FIG. 1 is that a static induction transistor (SIT) and an SiC diode using a silicon carbide (SiC) composition material are used. SiC-SIT, compared with the switching devices using a silicone composition material, has excellent characteristics in both aspects of the on resistance and switching speed and the temperature characteristic.

In the drawing, the first and second switching circuits and the switching devices 1 to 4 and 21 to 24 and diodes 11 to 14 and 31 to 34 of the voltage clamp circuit 70 are composed of an SiC composition material and have a junction temperature characteristic of Tj=160 to 300 [° C.] or lower. Further, these switching devices are static induction transistors (SIT) using an SiC composition material and the on resistance is positioned on a straight line connecting two points of (1) 0.1 to 1 [mΩ·cm$^2$] at 600 [V] of a withstand voltage of the SIT and (2) 0.2 to 15 [mΩ·cm$^2$] at 2000 [V].

Figure 12:
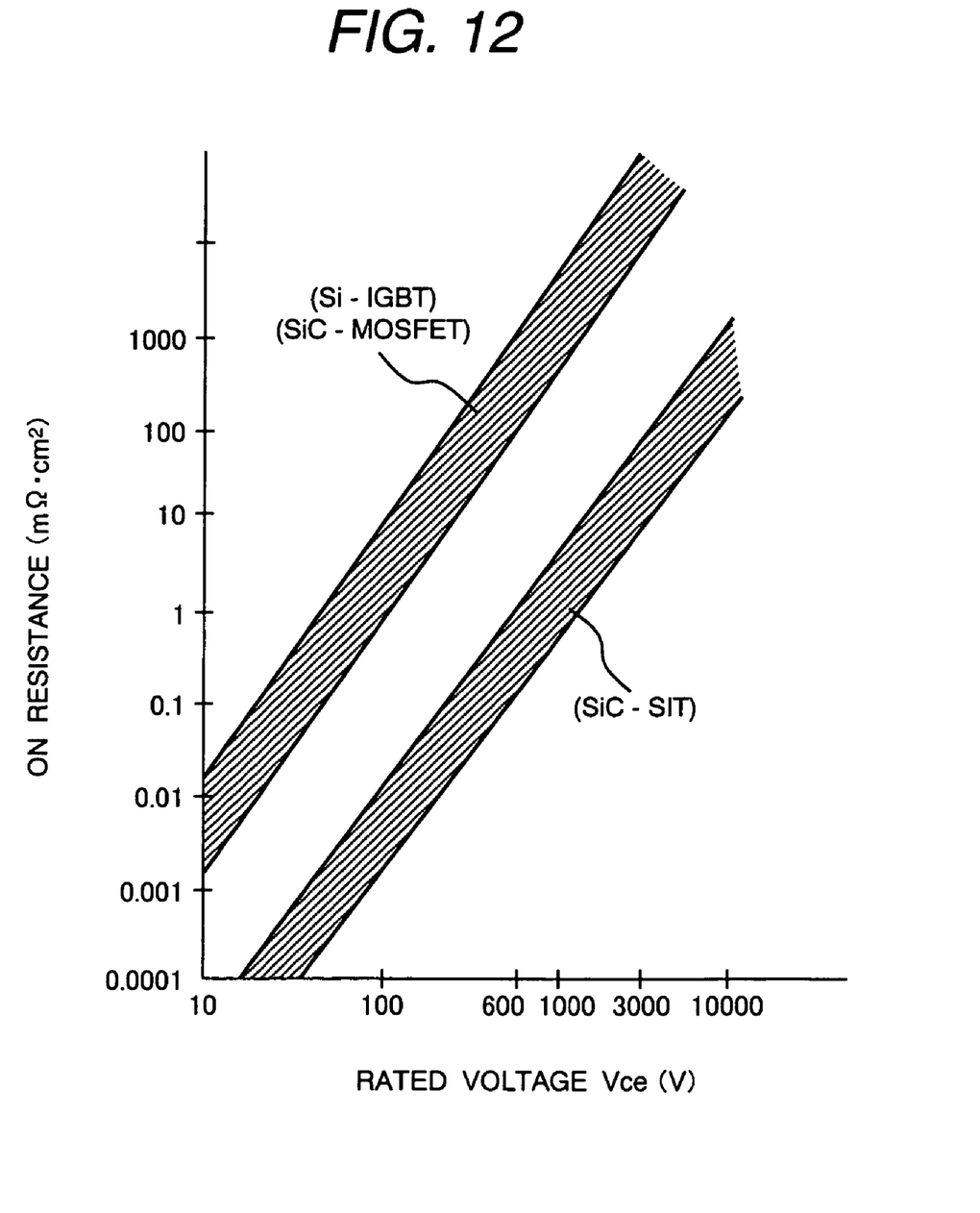
FIG. 12 is an on resistance characteristic diagram of SiC-SIT used on FIG. 11.

FIG. 12 is a drawing showing the on resistance characteristic for the rated voltage VCE (rated voltage between the collector and the emitter) of SiC-SIT used in the third embodiment of the present invention. The axis of ordinate indicates the on resistance [mΩ·cm$^2$], and the axis of abscissa indicates the rated voltage VCE [V], and the on resistance characteristic of SiC-SIT and the on resistance characteristic of Si-IGBT and SiC-MOSFET are compared. In FIG. 12, in SiC-SIT, the on resistance is small in a wide range of the rated voltage VCE and is an on resistance smaller than Si by two digits. With respect to the temperature characteristic, Si has a temperature of Tj=155 [° C.] or lower, while SiC has a junction temperature of Tj=160 to 300 [° C.]. For example, in a rotating machine having a maximum heat-proof insulation permissible temperature of 220 [° C.] or lower, a rotating machine switching circuit and the DC-DC converter of this embodiment can be built in integrally. In this case, when the switching devices of this embodiment are mounted in thermal contact with the rotating machine, the switching devices can be cooled by the temperature of the rotating machine.

The present invention can be applied to transfer of power in a car power source system having two batteries at different voltages and also general industrial dispersed power sources.

What is claimed is:

1. An isolated bidirectional DC-DC converter comprising:
 a first DC power source;
 a first switching circuit connected between said first DC power source and a primary winding of a transformer for converting power mutually between direct current and alternating current;
 a second switching circuit which is a current fed type switching circuit capable of dropping or increasing a voltage including a reactor connected between a secondary winding of said transformer and a positive pole of a second DC power source and is connected with the positive pole of the second DC power source through said reactor;
 a voltage clamp circuit including a series unit of a switching device with a reverse parallel diode and a capacitor;
 wherein one terminal of the series unit is electrically connected to one terminal of the second DC power source;
 wherein the other terminal of the series unit is connected to a connecting point connected in series of said secondary winding of the transformer and said second switching circuit;
 wherein said connecting point is connected to the positive terminal of the second DC power source through said reactor, and
 wherein at time of buck, energy which is charged in said capacitor is discharged into the second DC power source side through said reactor.

2. An isolated bidirectional DC-DC converter according to claim 1, further comprising a control unit, which at time of buck, turns on said switching device of said voltage clamp circuit such that said first switching circuit short-circuits both ends of said primary winding, and turns off the switching device of the voltage clamp circuit in response to a predetermined reduction in a current of said primary winding or said secondary winding.

3. An isolated bidirectional DC-DC converter according to claim 1, further comprising a control unit at time of voltage boost in said second switching circuit for turning on said each switching device of said voltage clamp circuit during an off period of a main switching device in a parallel connection state with respective voltage clamp circuits.

4. An isolated bidirectional DC-DC converter according to claim 1, wherein said first switching circuit is a voltage fed type switching circuit.

5. An isolated bidirectional DC-DC converter according to claim 1, wherein said first switching circuit has two sets of switching arms composed of two switching devices with a reverse parallel diode connected in series, and said two sets of switching arms are connected to said first DC power source in parallel, and between points connected in series in said two sets of switching arms, said primary winding of said transformer is connected.

6. An isolated bidirectional DC-DC converter according to claim 1, further comprising a reactor connected between an AC terminal of said first switching circuit and a terminal of said primary winding of said transformer.

7. An isolated bidirectional DC-DC converter according to claim 1, wherein said first and second switching circuits and said switching device and said diodes of said voltage clamp circuit are composed of an silicon carbide (SiC) composition material and have a junction temperature characteristic of Tj=160 to 300, and said switching devices are composed of static induction transistors (SIT) using an SiC composition material, and an on resistance is positioned on a straight line connecting two points of (1) 0.1 to 1 at 600 of a withstand voltage of said SIT and (2) 0.2 to 15 at 2000.

8. An isolated bidirectional DC-DC converter according to claim 1, wherein said first and second switching circuits and said switching device and said diodes of said voltage clamp circuit are arranged in thermal contact with a rotating machine.

9. An isolated bidirectional DC-DC converter according to claim 1, wherein said second switching circuit is a current doubler synchronous rectifier circuit.

10. An isolated bidirectional DC-DC converter according to claim 9, wherein in said current doubler synchronous rectifier circuit, 2 sets of switching arms composed of switching devices with a reverse parallel diode and reactors which are connected in series are connected to said second DC power source in parallel, and said secondary winding of said transformer is connected between points connected in series in said two sets of switching arms, and said two voltage clamp circuits are connected between both ends of said two switching devices with a reverse parallel diode.

11. An isolated bidirectional DC-DC converter according to claim 9, further comprising a control unit, which at time of buck, turns on said switching device of said voltage clamp circuit such that a voltage is applied from said first switching circuit to said primary winding of said transformer to short-circuiting of both ends of said primary winding by said first switching circuit and turns off the switching device of the voltage clamp circuit in response to a predetermined reduction in a current of said primary winding or said secondary winding.

12. An isolated bidirectional DC-DC converter according to claim 9, further comprising a control unit at time of voltage boost in said second switching circuit for turning on said each switching device of said voltage clamp circuit during an off period of a main switching device in a parallel connection state with said respective switching devices of said voltage clamp circuit.

13. An isolated bidirectional DC-DC converter comprising:
 a first DC power source;
 a first switching circuit connected between said first DC power source and a primary winding of a transformer for converting power mutually between direct current and alternating current;

a second switching circuit which is a current fed type switching circuit capable of dropping or increasing a voltage including a reactor connected between a secondary winding of said transformer and a positive pole of a second DC power source and is connected with the positive pole of the second DC power source through said reactor;

a voltage clamp circuit including a series unit of a switching device with a reverse parallel diode and a capacitor;

wherein one terminal of the series unit is electrically connected to one terminal of the second DC power source;

wherein the other terminal of the series unit is connected to a connecting point connected in series of said secondary winding of the transformer and said second switching circuit;

wherein said connecting point is connected to the positive terminal of the second DC power source through said reactor, and wherein said voltage clamp circuit has a plurality of switching devices and a plurality of chip type laminated ceramics capacitors, and said plurality of chip type laminated ceramics capacitors are arranged in parallel on a plane substrate, and said plurality of switching devices are arranged side by side so that drain terminals of said plurality of switching devices having said built-in reverse parallel diode approach opposite to said chip type laminated ceramics capacitors, and by a wiring pattern having a width wider than a width of said parallel bodies, said plurality of drain terminals of said plurality of switching devices and one end of said plurality of chip type laminated ceramics capacitors are connected electrically.

* * * * *

UNITED STATES PATENT AND TRADEMARK OFFICE
CERTIFICATE OF CORRECTION

PATENT NO.       : 7,638,904 B2
APPLICATION NO. : 11/206226
DATED            : December 29, 2009
INVENTOR(S)      : Shoji et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 265 days.

Signed and Sealed this

Eighteenth Day of January, 2011

David J. Kappos
*Director of the United States Patent and Trademark Office*